US010025504B2

(12) United States Patent
Takeda et al.

(10) Patent No.: US 10,025,504 B2
(45) Date of Patent: Jul. 17, 2018

(54) INFORMATION PROCESSING METHOD, INFORMATION PROCESSING APPARATUS AND NON-TRANSITORY COMPUTER READABLE MEDIUM

(71) Applicant: KABUSHIKI KAISHA TOSHIBA, Tokyo (JP)

(72) Inventors: Susumu Takeda, Kanagawa (JP); Shinobu Fujita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 22 days.

(21) Appl. No.: 15/014,673

(22) Filed: Feb. 3, 2016

(65) Prior Publication Data
US 2016/0154589 A1 Jun. 2, 2016

Related U.S. Application Data

(63) Continuation of application No. PCT/JP2014/070750, filed on Aug. 6, 2014.

(30) Foreign Application Priority Data

Aug. 7, 2013 (JP) ................................. 2013-164584

(51) Int. Cl.
*G06F 3/06* (2006.01)
*G06F 11/34* (2006.01)
(Continued)

(52) U.S. Cl.
CPC .......... *G06F 3/0611* (2013.01); *G06F 3/0631* (2013.01); *G06F 3/0683* (2013.01);
(Continued)

(58) Field of Classification Search
None
See application file for complete search history.

(56) References Cited

U.S. PATENT DOCUMENTS 9,547,594 B2* 1/2017 Willhalm ............ G06F 12/0811
2005/0155020 A1* 7/2005 DeWitt, Jr. ........... G06F 12/126
717/130
(Continued)

FOREIGN PATENT DOCUMENTS

WO WO 2004/044745 5/2004
WO WO 2009/096161 8/2009

OTHER PUBLICATIONS

"Intel® 64 and IA-32, Architectures, Optimization Reference Manual", 2012, pp. 1-800, (2012).
(Continued)

*Primary Examiner* — Midys Rojas
(74) *Attorney, Agent, or Firm* — Finnegan, Henderson, Farabow, Garrett & Dunner, L.L.P.

(57) ABSTRACT

According to one embodiment, an information processing method including: detecting by a time information acquiring unit a start and an end of an access of a memory access unit to a target memory, the access of the memory access unit being due to instructions of an instruction issuer, and acquiring by the time information acquiring unit a memory access time being a time from the start of the access till the end of the access; calculating by a computation amount acquiring unit, based on the instructions of the instruction issuer, a computation amount of a computing unit from the start of the access till the end of the access; and evaluating by an evaluation unit, based on the memory access time and the computation amount, computing performance of the computing unit from the start of the access till the end of the access.

6 Claims, 13 Drawing Sheets

(51) Int. Cl.
*G06F 12/08* (2016.01)
*G06F 12/0897* (2016.01)
(52) U.S. Cl.
CPC ...... *G06F 11/3419* (2013.01); *G06F 11/3466* (2013.01); *G06F 12/08* (2013.01); *G06F 12/0897* (2013.01); *G06F 2201/88* (2013.01); *G06F 2201/885* (2013.01); *G06F 2212/1024* (2013.01)

(56) References Cited

U.S. PATENT DOCUMENTS

| | | |
|---|---|---|
| 2005/0210471 A1 | 9/2005 | Okawara |
| 2006/0265542 A1 | 11/2006 | Shen et al. |
| 2010/0332690 A1 | 12/2010 | Kawamura et al. |
| 2015/0378919 A1* | 12/2015 | Anantaraman ..... G06F 12/0862 711/122 |

OTHER PUBLICATIONS

David Levinthal; "Performance Analysis Guide for Intel® Core™ i7 Processor and Intel® Xeon™ 5500 Processors", pp. 1-72, (2008).
International Search Report issued by the Japanese Patent Office in International Application No. PCT/JP2014/070750, dated Oct. 21, 2014 (1 page).

* cited by examiner

42

| TIME COUNTER | ~421 |
|---|---|
| INSTRUCTION COUNT COUNTER | ~422 |

| | 0xA | 0xB | 0xC | ... |
|---|---|---|---|---|
| START TIME INFORMATION | ST1 | ST2 | ST3 | ... |
| START INSTRUCTION COUNT INFORMATION | N1 | N2 | N3 | ... |

| NON-MEM TIME INFORMATION | NON-MEM INSTRUCTION COUNT INFORMATION |
|---|---|
| L1 CACHE TIME INFORMATION | L1 CACHE COUNT INFORMATION |
| L2 CACHE TIME INFORMATION | L2 CACHE INSTRUCTION COUNT INFORMATION |
| MAIN STORAGE TIME INFORMATION | MAIN STORAGE INSTRUCTION COUNT INFORMATION |

FIG. 4

|  | TIME | INSTRUCTION COUNT |
|---|---|---|
| NON-MEM | 1000 | 4000 |
| L1 CACHE | 1000 | 4000 |
| L2 CACHE | 20 | 1 |
| MAIN STORAGE | 200 | 200 |

FIG. 11

|  | TIME | INSTRUCTION COUNT |
|---|---|---|
| NON-MEM | 1000 | 4000 |
| L1 CACHE | 1000 | 4000 |
| L2 CACHE | 500 | 2000 |
| MAIN STORAGE | 200 | 200 |

FIG. 12

| MEMORY HIERARCHY | IPC |
|---|---|
| NON-MEM | 4 |
| L1 CACHE | 4 |
| L2 CACHE | 4 |
| MAIN STORAGE | 1 |

FIG. 13

|  | TIME | INSTRUCTION COUNT |
|---|---|---|
| NON-MEM | 1000 | 4000 |
| L1 CACHE | 1000 | 4000 |
| L 2 CACHE | 1000 | 300 |
| MAIN STORAGE | 200 | 50 |

FIG. 14

| MEMORY HIERARCHY | IPC |
|---|---|
| NON-MEM | 4 |
| L1 CACHE | 4 |
| L 2 CACHE | 0.3 |
| MAIN STORAGE | 0.25 |

FIG. 15

| | Set1 (000) | Set2 (001) | Set3 (010) | Set4 (011) | Set5 (100) | Set6 (101) | Set7 (110) | Set8 (111) |
|---|---|---|---|---|---|---|---|---|
| 1way | | | | | | | | |
| 2way | | | | | | | | |
| 3way | | | | | | | | |
| 4way | | | | | | | | |
| 5way | | | | | | | | |
| 6way | | | | | | | | |
| 7way | | | | | | | | |
| 8way | | | | | | | | |

FIG. 18

INFORMATION PROCESSING METHOD, INFORMATION PROCESSING APPARATUS AND NON-TRANSITORY COMPUTER READABLE MEDIUM

CROSS REFERENCE TO RELATED APPLICATIONS

This application is a Continuation of International Application No. PCT/JP2014/070750, filed on Aug. 6, 2014, the entire contents of which is hereby incorporated by reference.

FIELD

Embodiments described herein relate to an information processing method, an information processing apparatus and a non-transitory computer readable medium program.

BACKGROUND

As indicated by the "Memory Wall" problem (as dubbed by William Wulf and Sally McKee), memory access largely affects the performance of a processor. Further, memory access latency hiding techniques such as "Out-of-Order" and SMT (Simultaneous Multithreading) are becoming common.

The impact of a particular memory access on the computing performance of a processor dynamically varies depending on the properties of the operating program and the size of the hardware resources.

It is extremely important when analyzing the performance of a processor to identify the Impact of the particular memory access has on the computing performance of the processor. However, the problem is the low accuracy of evaluating the degree to which the particular memory access affects the computing performance of the processor.

Considering the above, one aspect of the present invention endeavors to provide an information processing method, an information processing apparatus and a program which allow for the accurate evaluation of a degree to which a particular memory access affects the computing performance of a processor.

BRIEF DESCRIPTION OF THE DRAWINGS

FIG. 2 is a schematic block diagram illustrating a global counter 42 in the first embodiment;

FIG. 3 illustrates one example of a memory access information table T1 stored on a memory access information table storage 43 in the first embodiment;

FIG. 4 illustrates one example of a memory hierarchy-based information table T2 stored on a memory hierarchy-based information table storage 44 in the first embodiment;

FIG. 11 illustrates a first example of a memory hierarchy-based information table after a program is operated by a MRAM core;

FIG. 12 illustrates a second example of the memory hierarchy-based information table after a program is operated by the MRAM core;

FIG. 13 is a table illustrating an IPC for each memory hierarchy in the case of the memory hierarchy-based information table in FIG. 12;

FIG. 14 illustrates a third example of the memory hierarchy-based information table after a program is operated by the MRAM core;

FIG. 15 is a table illustrating the IPC for each memory hierarchy in the case of the memory hierarchy-based information table in FIG. 14;

FIG. 18 illustrates one example of a conceptual diagram of a cache memory in the second embodiment.

DETAILED DESCRIPTION

According to one embodiment, an Information processing method including: detecting by a time information acquiring unit a start and an end of an access of a memory access unit to a target memory, the access of the memory access unit being due to instructions of an Instruction issuer, and acquiring by the time information acquiring unit a memory access time being a time from the start of the access till the end of the access; calculating by a computation amount acquiring unit, based on the instructions of the instruction issuer, a computation amount of a computing unit from the start of the access till the end of the access; and evaluating by an evaluation unit, based on the memory access time and the computation amount, computing performance of the computing unit from the start of the access till the end t of the access.

[Embodiments]

In-depth descriptions of embodiments of the present invention will hereinafter be made with reference to the accompanying drawings.

(First Embodiment)

Figure 1:
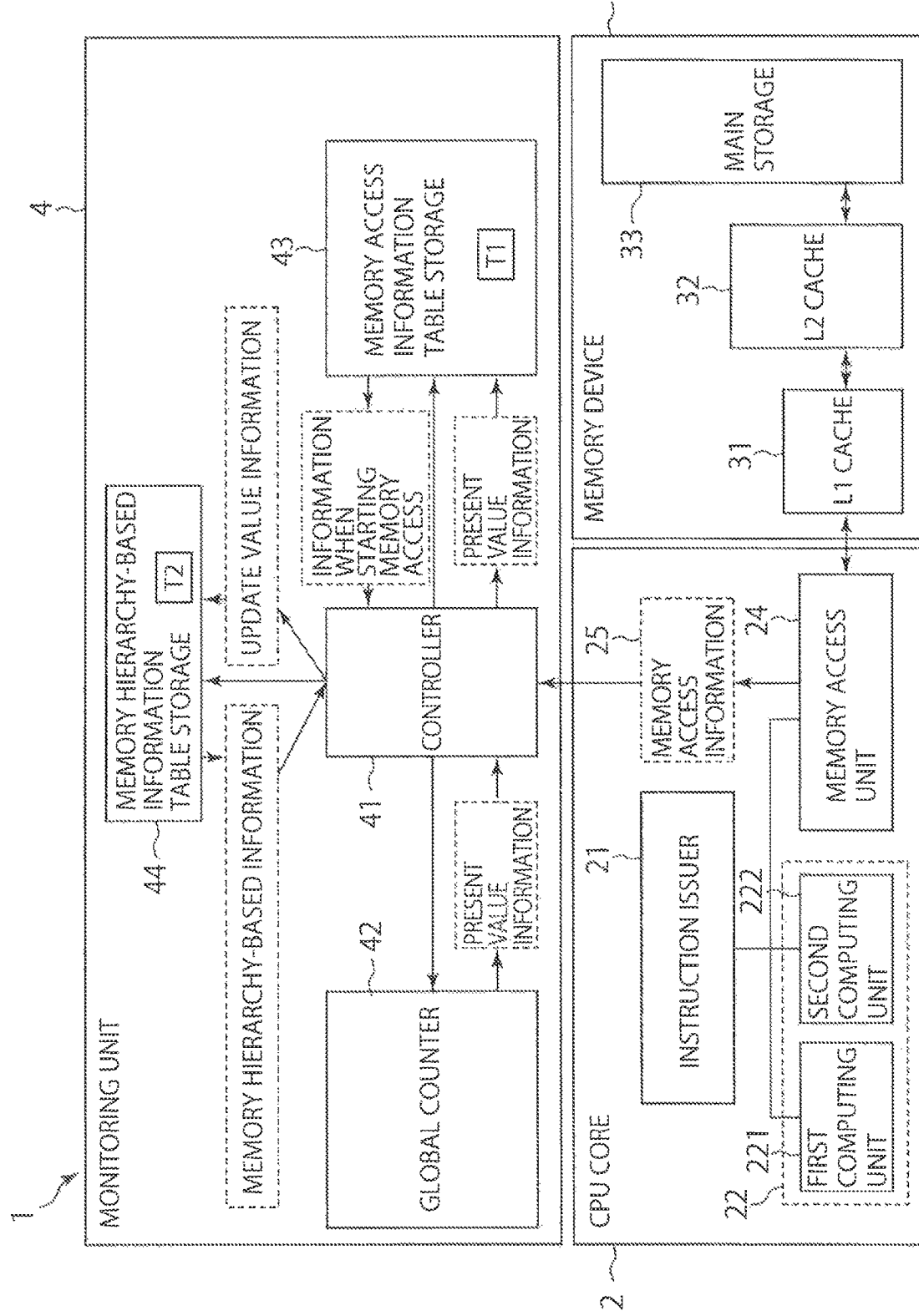
FIG. 1 is a schematic block diagram illustrating a processor 1 in a first embodiment.

FIG. 1 is a schematic block diagram illustrating a processor 1 in a first embodiment. Blocks depicted in solid lines represent blocks having physical functions, logical functions, or storage areas. Blocks depicted in broken lines represent information transferred and received between the function blocks. Arrows indicate transmission paths of the information. These storage areas may be realized by using whatever means capable of storing information. For example, hardware such as registers, or variables of software such as C language may be used.

The function blocks may also be realized by using whatever means capable of realizing the desired functions. For instance, hardware such as adders and subtractors, or adding and subtracting functions of software such as C language may also be used. The transmission paths of the information may take whatever form capable of correctly transferring and receiving the information. For example, hardware such as wires for transmitting signals, or substitutions of variables of software such as C language may also be used.

A processor 1 includes: a CPU (Central Processing Unit) core 2 connected to a memory device 3 and a monitoring unit 4; the memory device 3 connected to the CPU core 2; and the monitoring unit (information processing apparatus) 4 connected to the CPU core 2.

The CPU core 2 operates a program on an instruction-by-instruction basis. Herein, the CPU core 2 includes: an instruction issuer 21 connected to a computing unit 22 and a memory access unit 24; the computing unit 22 connected to the instruction issuer 21 and the memory access unit 24; and the memory access unit 24 connected to the instruction issuer 21 and the computing unit 22. Herein, the computing unit 22 includes: a first computing unit 221 connected to the Instruction issuer 21 and the memory access unit 24; and a second computing unit 222 connected to the Instruction issuer 21 and the memory access unit 24.

The Instruction issuer 21 issues instructions to the first computing unit 221, the second computing unit 222, and the memory access unit 24, etc.

The first computing unit 221 and the second computing unit 222 perform calculations according to the instructions issued by the instruction issuer 21.

The memory access unit 24 issues to the memory device 3 a request for access to the memory device 3.

Note that the first embodiment exemplifies two computing units and one memory access unit as components of the CPU core 2 but is not limited to this configuration. The CPU core may be a function block having a computing function and may have one or more computing units. Further, it may, for example, have one or three or more computing units, and the CPU core 2 may have a plurality of memory access units and a plurality of instruction issuers.

Data and program codes are stored in the memory device 3. As one example, the memory device 3 may be configured as a 3-level hierarchy structure including a L1 cache 31 connected to the memory access unit 24, a L2 cache 32 connected to the L1 cache 31 and a main storage 33, and the main storage 33 connected to the L2 cache 32. The memory hierarchy structure designates a group of memories which are capable of storing data of a shared memory area and which differ in their access speed from the CPU core 2. In the first embodiment, the L1 cache 31 exhibits the fastest access speed from the CPU core 2, while the main storage exhibits the slowest access speed.

Note that the first embodiment exemplifies a 3-level memory hierarchy but is not limited to this configuration. For example, a 4-level hierarchy structure including the L1 cache, the L2 cache, a L3 cache and the main storage may also be conceivable, as might be a 2-level hierarchy structure consisting of the L1 cache and the main storage. A 5- or higher level hierarchy structure may further be possible. Moreover, though not illustrated in FIG. 1, the main storage may be connected to an auxiliary storage device, etc.

The monitoring unit 4 monitors the CPU core 2 and the memory device 3, and evaluates the computing performance of the computing unit 22 from a start to an end of accessing the memory. The computing performance designates performance indices such as an instruction count being issued, committed or executed per time (e.g., an execution cycle or execution time), i.e., the Instruction count being issued, committed or executed per time unit, or a usage ratio of the computing unit per time unit.

As illustrated in FIG. 1, the monitoring unit 4 includes: a controller (control circuit) 41; a global counter 42 connected to the controller 41; a memory access information table storage 43 connected to the controller 41; and a memory hierarchy-based information table storage 44 connected to the controller 41.

The global counter 42 is a storage area for retaining a status of the CPU core 2 during execution. FIG. 2 is a schematic block diagram illustrating the global counter 42 in the first embodiment. As illustrated in FIG. 2, the global counter 42 features a time counter 421 and an instruction count counter 422.

The time counter 421 measures a period of time from an arbitrary point of time. Herein, "time" may be any time capable of quantitatively representing time information such as an amount of time depending on the implementation of a processor such as a clock cycle count or a time reading not depending on the Implementation of a processor.

An update timing of the time counter 421 may be an arbitrary timing. The counter may be updated every cycle, every 10 cycles or even every 1000 cycles.

The Instruction count counter 422 measures an instruction count from the arbitrary point of time. The instruction counts executed may be any information which is directly or approximately measurable (hereinafter executed instruction count). For example, a count of commit instructions may be measured as the count of such instructions. The count of instructions having been computed by the first computing unit 221 and the second computing unit 222 may also be measured as the count of such instructions, and an instruction issuance count may also be measured as the count of such instructions.

The update timing of the instruction count counter 422 may be an arbitrary timing. For instance, the update may be timed at a fixed cycle count or may be timed at a fixed instruction count.

The memory access information table storage 43 records information with regard to the memory being accessed. FIG. 3 depicts one example of a memory access information table T1 stored in the memory access information table storage 43 of the first embodiment. As depicted in the memory access information table T1 of FIG. 3, for each memory access, the memory access information table storage 43 contains a memory access ID for identifying the memory access, a start time information and a start instruction count information, all this information being stored to be correlated with each other. Herein, the start time information is information of a time reading when the memory access started (e.g., a value of the time counter 421). Further, the start instruction count information represents an instruction count at a point of time when the memory access started (e.g., a value of the instruction count counter 422).

Note that various types of information can be used as memory access ID. For example, the memory access information table storage 43 may use as the memory access ID a memory address of an access destination, or an ID being uniquely issued upon the memory access.

The memory hierarchy-based information table storage 44 records, for each memory, information regarding the access to a target hierarchy. FIG. 4 illustrates one example of a memory hierarchy-based information table T2 stored in the memory hierarchy-based information table storage 44 of the first embodiment. "Non-mem time information" in FIG. 4 represents time exclusive of memory accessing. As illustrated in the memory hierarchy-based information table T2 of FIG. 4, for each memory, the memory hierarchy-based information table storage 44 contains time information and instruction count information being stored to be correlated with each other. Herein, the time information is an Integrated value of the time expended for accessing the memory.

The Instruction count information is an integrated value of the instruction count executed during accessing the memory.

The controller 41 controls the global counter 42, the memory access information table storage 43 and the memory hierarchy-based information table storage 44. Further, the controller 41 has computing functions of performing additions and subtractions.

Figure 5:
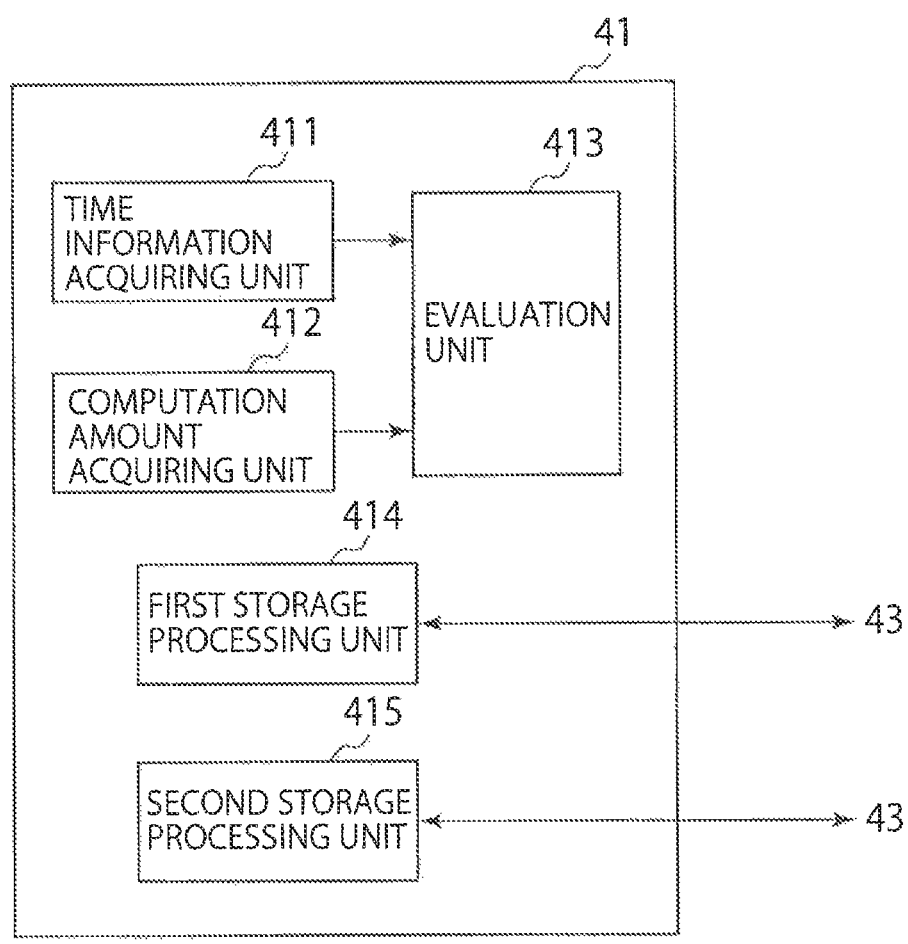
FIG. 5 is a schematic block diagram illustrating a controller 41 in the first embodiment.

FIG. 5 is a schematic block diagram illustrating the controller 41 in the first embodiment. The controller 41 features: a time information acquiring unit 411 connected to an evaluation unit 413; a computation amount acquiring unit 412 connected to the evaluation unit 413; the evaluation unit 413 connected to the time information acquiring unit 411 and the computation amount acquiring unit 412; a first storage processing unit 414 connected to the memory access information table storage 43; and a second storage processing unit 415 connected to the memory access information table storage 43.

The first storage processing unit 414 causes the memory access information table storage 43 to store, as start time information, a value of the time counter at the time memory accessing starts, the value being measured by the time counter for measuring a period of time from an arbitrary point of time of a program.

The second storage processing unit 415 causes the memory access information table storage 43 to store, as start instruction count information, a value of the instruction count counter 422 at the time memory accessing starts, the value being counted by the instruction count counter 422 for counting the Instruction count from the arbitrary point of time of the program.

The time information acquiring unit 411 detects a start and an end of an access to a target memory by the memory access unit 24 following an instruction of the instruction issuer 21 and, based on this detection, acquires a period of time from the start to the end of the access as memory access time. To be more specific, the time information acquiring unit 411 acquires said memory access time with respect to the target memory. The time information acquiring unit 411 acquires the memory access time with respect to all of the memories by executing said process for all of the memories. In other words, the time information acquiring unit 411 acquires the memory access time for each memory.

Concretely, for example, the time information acquiring unit 411 calculates the memory access time by comparing the time readings from the start to the end of memory accessing. More specifically, the time information acquiring unit 411 acquires, for example, the start time information stored in the memory access information table storage 43, acquires the time counter value at the end of memory accessing and thus acquires a difference between the acquired start time information and the acquired time counter value as the memory access time of the memory from which the target data is acquired when accessing the memory.

The time information acquiring unit 411 outputs the memory access time information indicating the acquired memory access time to the evaluation unit 413.

The computation amount acquiring unit 412 calculates, from the start to the end of the target memory being accessed by the memory access unit 24, a computation amount based on the instructions of the instruction issuer 21. The computation amount acquiring unit 412 calculates the computation amounts with respect to all of the memories by executing said process for all of the memories. In other words, the computation amount acquiring unit 412 calculates the computation amount for each memory.

Herein, the computation amount is, for example, the count of instructions being issued, committed or executed. Based on this premise, the computation amount acquiring unit 412 calculates the instruction count from the start to the end of the access by comparing the instruction count at the start of memory accessing with the instruction count at the end of memory accessing, for example.

More specifically, the computation amount acquiring unit 412 acquires, for example, the start instruction count information stored in the memory access information table storage 43, acquires the value of the instruction count counter 422 at the end of memory accessing and thus acquires a difference between the acquired start instruction count information and the value of the instruction count counter 422 as the instruction count from the start to the end of accessing of the memory from which the target data is acquired when accessing the access.

The computation amount acquiring unit 412 outputs the computation amount information, representing the acquired computation amount (here, as one example, the instruction count), to the evaluation unit 413.

The evaluation unit 413 evaluates computing performance of the computing unit 22 during a period from the start to the end of the accessing on the basis of the memory access time acquired by the time information acquiring unit 411 and the computation amount acquired by the computation amount acquiring unit 412. In more detail, the evaluation unit 413 evaluates the computing performance of the computing unit 22 during the period from the start to the end of the target memory accessing on the basis of the memory access time of the target memory and the computation amount of the target memory. The evaluation unit 413 evaluates the computing performance of the computing unit 22 with respect to all of the memories by executing said process for all of the memories. In other words, the evaluation unit 413 evaluates the computing performance of the computing unit 22 during the period from the start to the end of accessing on the basis of the memory access information and the computation amount information of each hierarchically-connected memory.

An operation example of the monitoring unit 4 will hereinafter be described by taking a certain memory access for example. Since the monitoring unit 4 needs to operate when memory accessing starts and ends, each case will be discussed below.

<Monitoring Unit 4: Operations at Start of Memory Accessing>

Figure 6:
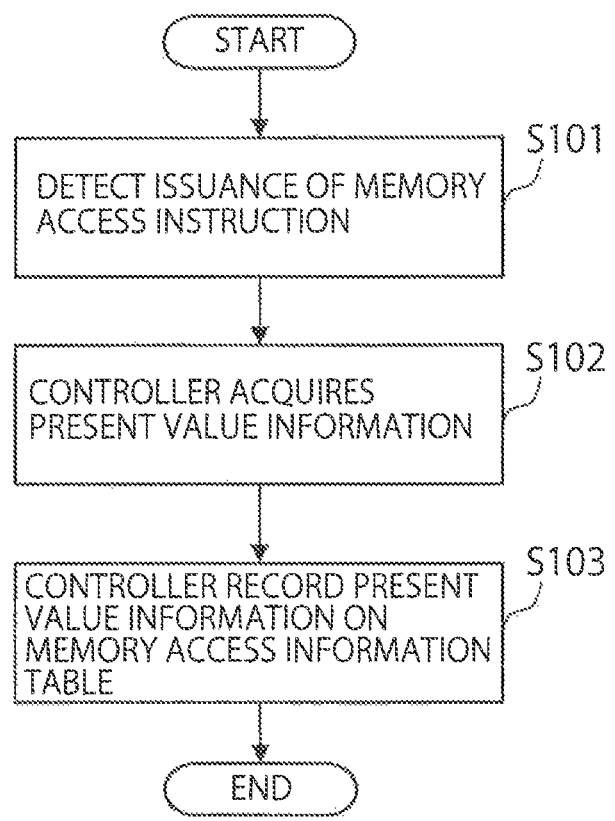
FIG. 6 is a flowchart illustrating one example of a process flow of a monitoring unit 4 at a start of memory accessing in the first embodiment.

FIG. 6 is a flowchart illustrating one example of a process flow of the monitoring unit 4 when starting the memory access in the first embodiment.

(Step S101) Upon a memory access instruction being issued to the memory access unit 24, the controller 41 detects the issuance of the memory access instruction. The method for realizing this operation may be any method which enables the controller 41 to detect the start of memory accessing. For example, as illustrated in FIG. 1, the memory access unit 24 accessing the memory may send the start of memory accessing to the controller 41, or the controller 41 may periodically monitor the memory access unit 24 thus detecting the start of memory accessing.

(Step S102) Next, the controller 41 monitors a status of the CPU core 2 at the time the memory accessing instruction is issued. Concretely, for example, the controller 41 refers to the value of the time counter 421 and to the value of the instruction count counter 422 installed on the global counter 42, and acquires these two values as current value information.

(Step S103) Subsequently, the controller 41 records the current value information together with the memory access ID, which identifies the memory access, to the memory access information table T1 of the memory access information table 43. Concretely, the controller 41 records the value of the time counter 421 in the start time information of the memory access information table and the value of the instruction count counter 422 in the start instruction count information of the memory access information table.

Through the operations described above, the memory access information table 43 records the time when the memory accessing starts and the count of the instructions executed up to the memory access start time.

<Monitoring Unit 4: Operations at End of Memory Accessing>

Figure 7:
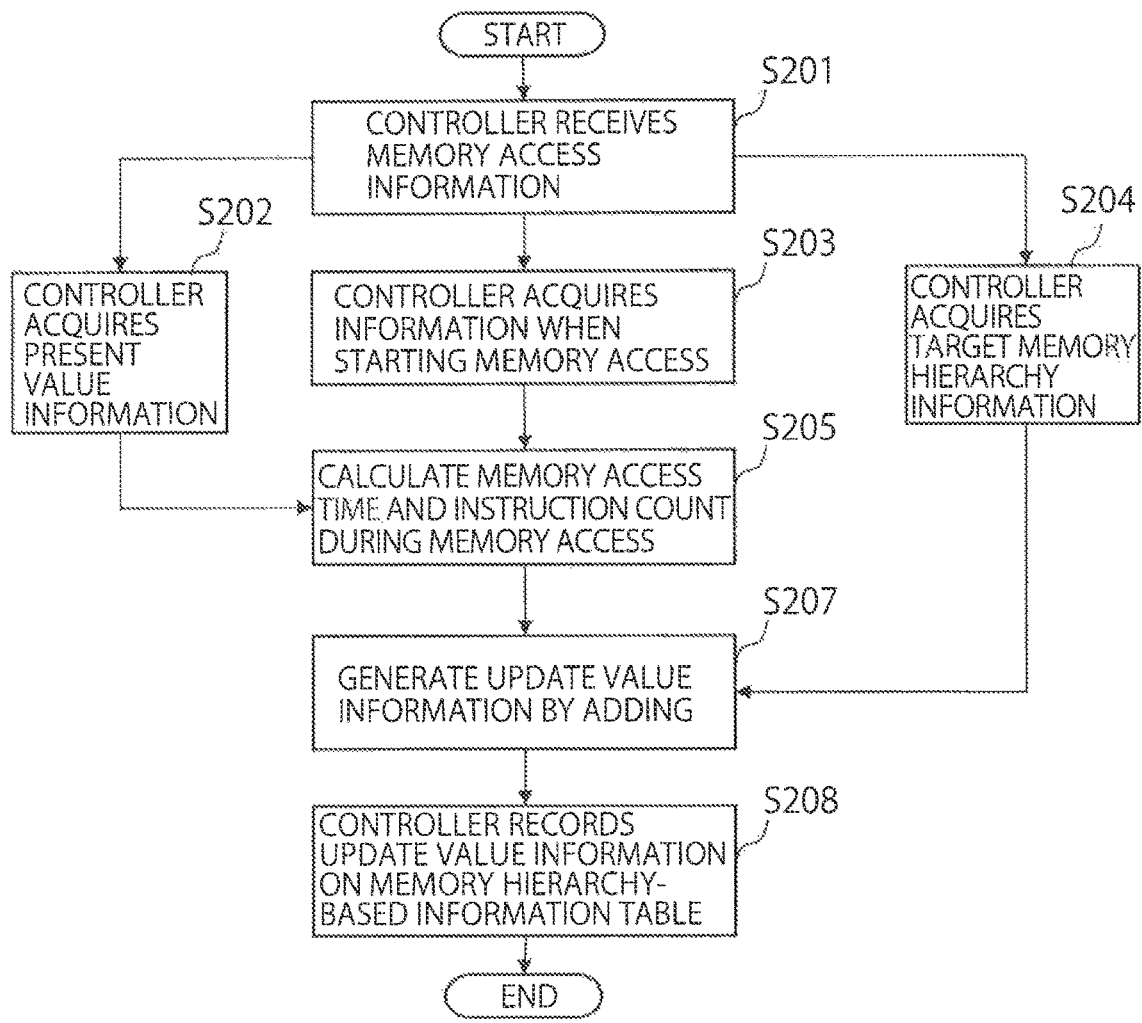
FIG. 7 is a flowchart illustrating one example of a process flow of a monitoring unit 4 at an end of memory accessing in the first embodiment.

FIG. 7 is a flowchart illustrating one example of a process flow of the monitoring unit 4 when ending the memory access in the first embodiment.

(Step S201) Firstly, the controller 41 receives the memory access information containing information of the end of the memory access from the memory access unit 24. The memory access information contains a memory access ID and memory identification information identifying the memory from which data was acquired by the memory access that ended.

The memory identification information may be any type of information capable of uniquely specifying the memories to form the memory device 3. For example, it may be text data such as "L1 cache" and "main storage", or it may be an identifier assigned to the memory. The memory identification information, for example, may be sent together with the data of the access target to the memory access unit 24, or may be sent to the controller 41 directly from the memory of the hierarchy on which the data exists.

Note that the memory access unit 24 may predict the memory from which data is acquired on the basis of the time needed for memory accessing. Concretely, if the time needed for memory accessing is a cycle count equal to or less than a first threshold value (e.g., equal to or less than 5), the memory access unit 24 may predict that the memory from which data is being acquired is the L1 cache, for example. Further, if the time needed for memory accessing is a cycle count within a predetermined range (equal to or larger than 10 but less than 50), the memory access unit 24 may predict that the memory which data is being acquired is the L2 cache, for instance. Moreover, if the time needed for memory accessing is a cycle count equal to or larger than a second threshold value (e.g., equal to or larger than 80), the memory access unit 24 may predict that the memory which data is being acquired is the main storage, for example.

FIG. 1 illustrates an embodiment where the memory access unit 24 sends the memory identification information to the controller 41. However, the manner of attaining the detection may be taken if enabling the controller 41 may use any method which ensures the detection of the end of memory accessing. For example, the controller 41 may periodically monitor the memory access unit 24. As shown in steps S202-S204, controller upon acquiring the information on the end of memory accessing, the controller 41 sends requests to the global counter 42, the memory access information table storage 43 and the memory hierarchy-based information table storage 44 to acquire the respective items of information.

(Step S202) The controller 41 acquires the current value information from the global counter 42. As already mentioned, the current value information contains the value of the time counter 421 and the value of the instruction count counter 422.

(Step S203) The controller 41 acquires, in parallel to step S202 and step S204, the start time information and the start instruction count information from the memory access information table storage 43.

(Step S204) The controller 41 acquires, in parallel to step S202 and step S203, the time information and the instruction count information with respect to the memory specified by the memory identification information acquired in step S201, namely, the memory which data is being acquired, from the memory hierarchy-based information table storage 44.

Note that, although FIG. 7 illustrates simultaneous execution of the processes in steps S202-S204, this simply indicates the feasibility of such simultaneous execution and the embodiment is not necessarily limited to it. For example, the processes in steps S202-S204 may be carried out sequentially.

(Step S205) Upon completing the processes in steps S203 and S204, the time information acquiring unit 411 of the controller 41 calculates a time from the start to the end of the target memory being accessed (hereinafter the memory access time). In concrete terms, for example, the time information acquiring unit 411 of the controller 41 subtracts the value of the start time information from the value of the time counter 421 of the global counter 42, and sets the difference as the memory access time.

Further, the computation amount acquiring unit 412 of the controller 41 calculates the instruction count executed during memory accessing (hereinafter the memory during-access instruction count). Moreover, the computation amount acquiring unit 412 of the controller 41 subtracts the value of the start instruction count information from the value of the instruction count counter 422 of the global counter 42, and sets the difference as the memory during-access instruction count, for example.

Subsequently, the controller 41 updates the memory hierarchy-based information table T2 on the basis of the target memory access time and the target memory during-access instruction count in the following manner.

(Step S207) Upon completing the processes in steps S205 and S206, the controller 41, for example, adds the memory access time calculated in step S205 to the value of the time information read in step S204, and sets the result as a time update value, one of the update value information. Similarly, for example, the controller 41 adds the memory during-access instruction count calculated in step S205 to the value of the instruction count information, and sets the result as an instruction count update value, one of the update value information.

(Step S208) Next, the controller 41 overwrites, in the memory hierarchy-based information table T2 stored on the memory hierarchy-based information table storage 44, the time information associated with the memory specified by the memory identification information acquired in step S201 with the time update value. Further, the controller 41 overwrites, in the memory hierarchy-based information table T2 stored on the memory hierarchy-based information table storage 44, the instruction count information associated with the memory specified by the memory identification information acquired in step S201 with the instruction count update value.

Through the operations described above, the memory access time and the memory during-access instruction count with respect to the target memory access are acquired.

Moreover, an integrated time of the memory access and an integrated value of the memory during-access instruction count are stored in the memory hierarchy-based information table T2 for each memory.

As discussed so far, according to the first embodiment, the time information acquiring unit 411 acquires the memory access time information which indicates the time needed for each memory access. Then, the computation amount acquiring unit 412 acquires the computation amount information, for each memory access, the computation amount during memory accessing.

Subsequently, the evaluation unit 413 evaluates, based on the memory access information and the computation amount information, the computing performance of the computing unit 22 during a period from the start to the end of accessing the target memory.

The controller 41 evaluates, based on the calculated memory access time and the calculated memory during-access instruction count, an execution efficiency of the processor 1, for example, the computing performance of the computing unit 22 during the period from the start to the end of the target memory being accessed. Concretely, as one example of this execution efficiency of the processor 1, the controller 41 calculates an instructions execution throughput during the memory access. For example, if the Instructions execution throughput is expressed as IPC (Instructions Per Cycle), the controller 41 divides the calculated memory during-access instruction count by the memory access time and sets the result as the IPC. The IPC thus calculated is with respect to the target memory access. The foregoing calculation of the computing performance based on the memory access time and the memory during-access instruction count may be conducted at arbitrary timing. For instance, the calculation may be conducted after step S205 and may also be conducted after step S208.

The computing performance of the computing unit 22 during the period from the start to the end of the target memory access can be thus evaluated, which enables accurately evaluating a degree of influence accessing the memory has on the computing performance.

It should be noted that, although the first embodiment presents a procedure of retaining the time and the instruction count in individual storage areas for each memory, the information to be retained may also be the computing performance per memory. For example, the controller 41 may record the IPC obtained by dividing the two values in the memory hierarchy-based information table T2 without individually recording the memory during-access instruction count.

In the processor 1 illustrated in FIG. 1, the CPU core 2, the memory device 3 and the monitoring unit 4 are exemplified as individual function units. However, the function blocks may, without being limited to such configuration, be segmented or joined. For instance, the memory access information table storage 43 may be implemented as joined to the memory access unit 24, and the control function of the controller 41 may be divided among counters or tables targeted to be controlled.

Moreover, the functions of the monitoring unit 4 may be implemented by using functions available in a general processor. For example, the time counter 421 of the monitoring unit 4 may use a cycle count measuring counter provided in the standard processor, and the computing operation of the controller 41 may use the first computing unit 221 or the second computing unit 222 both of the CPU core 2. The memory access unit 24 may divert memory access IDs from the memory access information table storage 43 as the identification information to tag each of its memory accesses in order to manage them.

Further, the function of the monitoring unit 4 may be implemented in a variety of manners. This function may be implemented entirely by hardware components, entirely by software components, or it may be implemented by a combination of both hardware and software. An example of an implementation using a combination of hardware and software may use hardware for the information storage functions and the information update functions of the global counter 42, of the memory hierarchy-based information table storage 44 and of the memory access information table storage 43 in FIG. 1, and may use software for the functions of the controller 41 which calculates the computing performance by reading said information.

(Second Embodiment)

A second embodiment will be hereinafter discussed. The second embodiment is an example of using the monitoring unit 4 in the first embodiment. It reveals the impact a specified memory has on the performance of a processor by using a computing performance during memory accessing being calculable from measurement information of the monitoring unit. This being the case, the processor in the second embodiment uses the computing performance during memory accessing as control information when selectively using a plurality of memories having different latencies.

Figure 8:
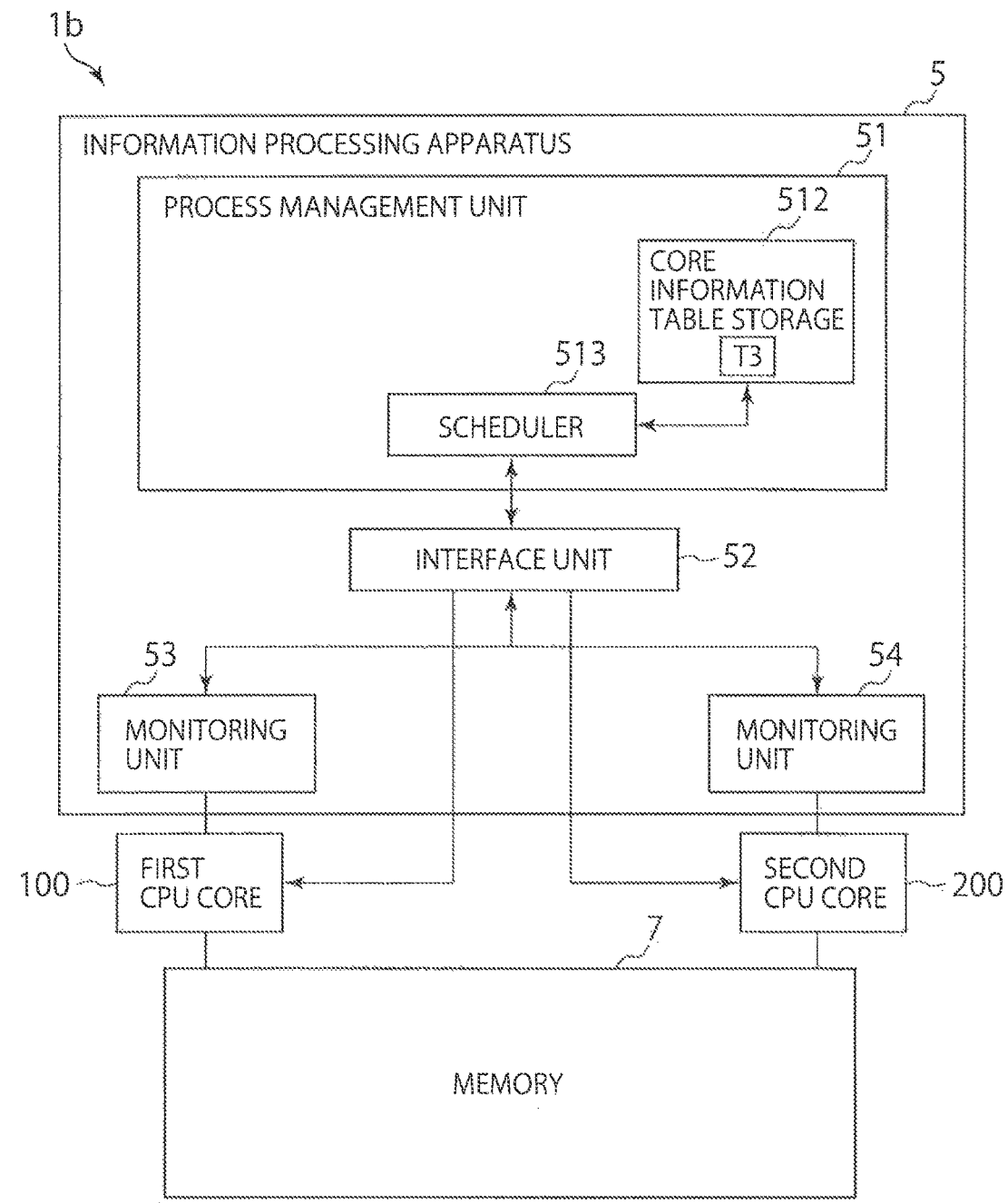
FIG. 8 is a schematic block diagram illustrating a processor 1b in a second embodiment.

FIG. 8 is a schematic block diagram illustrating a processor 1b in the second embodiment. The processor 1b includes: an information processing apparatus 5; a first CPU core 100 connected to the information processing apparatus 5 and a memory 7; a second CPU core 200 connected to the information processing apparatus 5 and the memory 7; and the memory 7.

The Information processing apparatus 5 controls the allocation of processes to the first CPU core 100 and the second CPU core 200. Herein, the information processing apparatus 5 includes: a process management unit 51 connected to an Interface unit 52; the interface unit 52 connected to the process management unit 51, the first CPU core 100 and the second CPU core 200; a monitoring unit 53 connected to the interface unit 52 and the first CPU core 100; and a monitoring unit 54 connected to the Interface unit 52 and the second CPU core 200.

The process management unit 51 manages the information of the processes and allocates the processes to the first CPU core 100 and the second CPU core 200. The term "process" represents a sequence of instructions consisting of two or more instructions, for example, a process, a thread and a basic block. A process management unit 20 includes: a core information table storage 512 connected to a scheduler 513; and the scheduler (allocation unit) 513 connected to the core information table storage 512 and the interface unit 52.

The process management unit 51 is mainly software. However, the process management unit 51 may partially or entirely be implemented by using hardware. In the case the process management unit 51 is implemented by using software, a program thereof may be operated by the first CPU core 100 or the second CPU core 200 in FIG. 1 and may also be operated by a computing device other than the first CPU core 100 and the second CPU core 200.

The core information table storage 512 is a table to record information per each core.

The scheduler 513 allocates the processes to any one of the first CPU core 100 and the second CPU core 200 via the interface unit 52 on the basis of the information of the core information table storage 512. On this occasion, the scheduler 513 allocates the processes to any one of the cores on the basis of, for example, the memory access time in addition to the computing performance of the computing unit 22.

In concrete terms, for example, the scheduler 513 may allocate the processes to any one of the cores on the basis of a comparative result of the respective memory access times acquired by the time information acquiring unit 411 and a comparative result of the respective computing performances obtained through evaluations by the evaluation unit 413. Furthermore, for example, the scheduler 513 may also allocate the processes to any one of the cores on the basis of a comparative result of the memory access time to the target memory obtained by the time information acquiring unit 411 and the memory access times to all of the memories, and the comparative result of the respective computing performances obtained through evaluations by the evaluation unit 413.

Note that the scheduler 513 may assign the cores to process the program on the basis of at least the computing performance of the computing unit 22. More specifically, the scheduler 513 compares the execution efficiency (e.g., IPCs) of each memory obtained through the evaluations by the evaluation unit of the monitoring unit 53, and may allocate the processes to any one of the cores on the basis of the comparison result.

Further, the scheduler 513 receives, via the interface unit 52, information from the first CPU core 100 and the second CPU core 200 and updates the content of the core information table storage 512.

The Interface unit 52 has an input/output function to exchange information with the monitoring unit 53, the monitoring unit 54, the first CPU core 100 and the second CPU core 200.

The monitoring unit 53, having the same function as the monitoring unit 4 in the first embodiment has, monitors the first CPU core 100 and the memory 7, and evaluates a degree of Influence the memory accessing has on the execution efficiency of the first CPU core 100.

The monitoring unit 54, having the same function as the monitoring unit 4 in the first embodiment has, monitors the second CPU core 200 and the memory 7, and evaluates a degree of Influence the memory accessing has on the execution efficiency of the second CPU core 200.

Figures 9, 10:
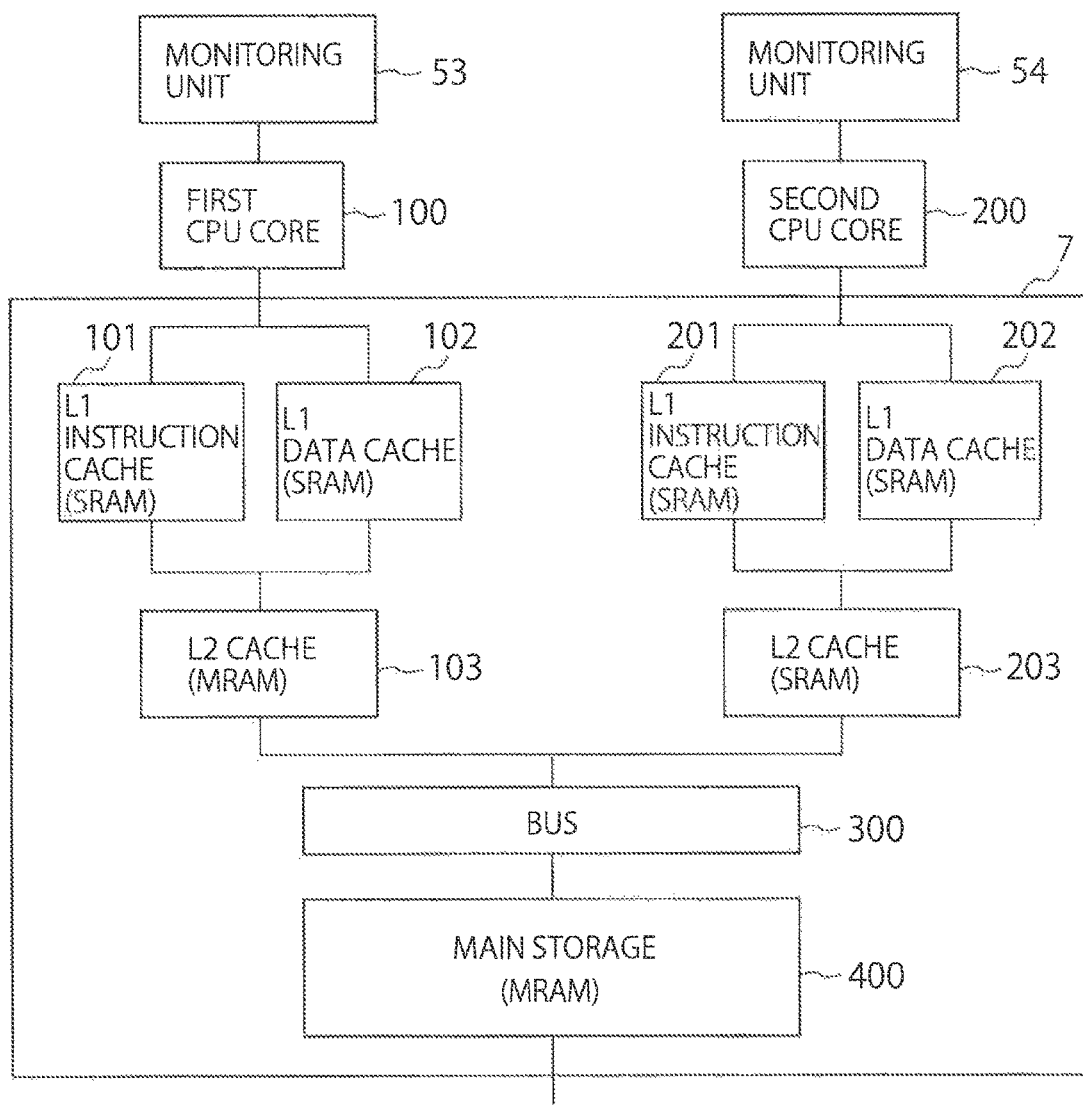
FIG. 9 illustrates one example of a core information table T3 in the second embodiment.
FIG. 10 is a schematic block diagram illustrating a memory 7 in the second embodiment.

FIG. 9 is one example of a core information table T3 in the second embodiment. The table in FIG. 9 a "core ID" field to identify the core is associated with a "local memory recording formula" field. In the second embodiment, the core ID of the first CPU core 100 is "1", while the core ID of the second CPU core 200 is "2". A type of core local memory is recorded in the "local memory recording formula" field.

Since an MRAM is used as the local memory, information (a character string "MRAM" in this example) enabling to identify the local memory as MRAM is recorded in the first CPU core 100.

Since an SRAM is used as the local memory, information (a character string "SRAM" in this example) enabling to identify the local memory as SRAM is recorded in the second CPU core 200.

In the second embodiment, the type of core local memory is expressed as character strings which are recorded. However, the identification information is not limited to character strings as long as it allows the scheduler 513 to identify a characteristic of the core. For example, it may be predetermined in the specifications that the MRAM corresponds to the value "1", while the SRAM corresponds to the value "2". In this case, in the core information table T3 retained in the core information table storage 512, "1" may be recorded for the local memory recording formula of the core ID 1, while "2" may be recorded for the local memory recording formula of the core ID 2.

The example in FIG. 9 is based on an assumption that only the local memory recording formula is recorded as information in the core information table T3 retained in the core information table storage 512. However, other categories of information may also be recorded. For example, a core computing capability such as operation frequency may also be recorded.

FIG. 10 is a schematic block diagram illustrating the memory 7 in the second embodiment. The memory 7 includes: a L1 instructions cache 101 connected to the first CPU core 100; a L1 data cache 102 connected to the first CPU core 100; and a L2 cache 103 connected to the L1 Instructions cache 101 and the L1 data cache 102.

The memory 7 further includes: a L1 instruction cache 201 connected to the second CPU core 200; a L1 data cache 202 connected to the second CPU core 200; and a L2 cache 203 connected to the L1 instruction cache 201 and the L1 data cache 202. The memory 7 also includes: a bus 300 connected to the L2 cache 103 and the L2 cache 203; and a main storage 400 connected to the bus 300.

As one example, all of the L1 caches (the L1 Instructions caches 101, 201, and the L1 data caches 102, 202) are composed of SRAMs, while the main storage is composed of MRAMs. On the other hand, regarding L2 caches, the L2 cache 103, which is accessible by the first CPU core 100, is an MRAM while the L2 cache 203, accessible by the second CPU core 200, is an SRAM.

Hereinafter, the first CPU core 100, which can access the MRAM L2 cache, will also be referred to as an MRAM core. The second CPU core 200, which can access the SRAM L2 cache, will also be referred to as an SRAM core.

Note that, as an example in the second embodiment, the MRAM-composed L2 cache 103 has a larger capacity but a larger latency (lower speed) than those of the SRAM-composed L2 cache 203. From an opposite point of view, the SRAM-composed L2 cache 203 has a smaller capacity but a smaller latency (high speed) than those of the MRAM-composed L2 cache 103.

There may be a variety of methods to appropriately use the first CPU core 100 and the second CPU core 200. A simple method is to have both the MRAM core and the SRAM core operate a program, and to select for use the core exhibiting the higher performance. However, this method entails advanced execution by both of the CPU cores in order to select the optimal CPU core. As a matter of course, it is desirable that the optimal CPU core can be selected through the execution by only one CPU core.

As one example of the method for selecting the optimal CPU core through the execution by only one CPU core, in the second embodiment, the scheduler 513 determines that the MRAM core which shortcomings upon executing a process do not affect the whole processor is the optimal MRAM core. In concrete terms, for example, the scheduler 513 initially allocates the process to the MRAM core. Then, if the latency, which is the shortcoming of the MRAM-composed L2 cache, does not affect the processor performance, the scheduler 513 allows the MRAM core to continue to carry out the process. In performing the foregoing control, the scheduler 513 uses, for example, the during-access IPC per memory measured by each of the monitoring units 53 and 54.

(First Processing Example in the Second Embodiment)

A first processing example in the second embodiment will be described hereinafter. There are two situations when the latency of the MRAM-composed L2 cache does not cause problems in the MRAM core. A first condition is that "the access time to the L2 cache is sufficiently shorter when compared to the execution time of the program". A second condition is that "despite the access time to the L2 cache being considerably longer when compared to the execution time of the program, owing to the effectiveness of memory access latency hiding techniques, the performance does not considerably decrease due to the influence of the latency of the L2 cache".

The scheduler 513 can determine these conditions from the information of the monitoring units 53 and 54. The scheduler 513 determines, as one example, the first condition from a ratio of the total execution time of the program which is occupied by the L2 cache time information in the memory hierarchy-based information table T2. The scheduler 513 determines, as one example, the second condition from the during-access IPC per memory, the IPC being calculated from the memory hierarchy-based information table T2. The respective determination processes will be exemplified hereinafter.

To begin with, FIG. 11 illustrates one example of the memory hierarchy-based information table after the MRAM core has executed a certain program as the first condition, i.e., the case when "the access time to the L2 cache is sufficiently shorter when compared to the execution time of the program". FIG. 11 depicts one example of the memory hierarchy-based information table after the MRAM core has executed a certain program. In the memory hierarchy-based information table in FIG. 11, the "Time" and the "Instructions Count" columns are associated with each other. "Non-mem" stands for no memory being accessed. "L1 cache" represents an access to the L1 cache. "L2 cache" represents an access to the L2 cache. "Main storage" represents an access to the main storage.

As will be understood by referring to the table in FIG. 11, total time excluding L2 cache (Non-mem, L1 cache, main storage) is 2200 cycles, while the access time to the L2 cache is 20 cycles. The ratio of the L2 cache access time to the total time thereof is extremely small. It is therefore understood that the latency of the MRAM L2 cache does not cause problems without even checking the L2 cache during-access IPC, and it can be determined that the execution of the target program by the MRAM core is optimal.

Next is an example of checking the second condition, namely, whether "despite the access time to the L2 cache being considerably longer when compared to the execution time of the program, owing to the effectiveness of memory access latency hiding techniques, the performance does not considerably decrease due to the influence of the latency on the L2 cache owing to an effect of a memory access latency hiding technique". Note that generally the CPU performance is more likely to decrease in a hierarchy with large memory access latency. Hence in general, the during-access IPC per memory is highest for memories with no memory access and lower for memories closer to the main storage. On the contrary, if the L2 cache during-access IPC measured by each of the monitoring units 53 and 54 does not differ from the IPC of a memory not being accessed or the IPC during the access of L1 cache, the scheduler 513 can determine that the performance decrease is not a factor of the L2 cache latency.

Let us consider a case of the memory hierarchy-based information table, for example as shown in FIG. 12, upon the MRAM core executing a certain program. FIG. 12 illustrates a second example of the memory hierarchy-based information table after the MRAM core has executed a certain program. Similarly to FIG. 11, in the memory hierarchy-based information table in FIG. 12, the "Time" and the "Instructions Count" columns are associated with each other. "Non-mem" stands for no memory being accessed. "L1 cache" represents the access to the L1 cache. "L2 cache" represents the access to the L2 cache. "Main storage" represents the access to the main storage.

The IPCs being calculated per memory hierarchy in this case are shown in the table of FIG. 13. FIG. 13 is a table illustrating the IPCs per memory in the case of the memory hierarchy-based information table in FIG. 12. Regarding the items in the table of FIG. 13, "Non-mem" stands for the IPC when no memory is being accessed, while the names of the other memories represent the IPCs during the access to the respective memories. From this example, since the L2 cache during-access IPC is "4", the IPC when there is no memory access is "4", and the L1 cache during-access IPC is also "4", it is understood that the performance of the processor 1b does not decrease due to the latency of the L2 cache. In other words, it is understood that the latency of the MRAM L2 cache does not cause problems in terms of the overall performance of the processor 1b in this case, and therefore the execution by the MRAM core can be determined as being optimal.

On the other hand, FIG. 14 illustrates an example of the memory hierarchy-based information table where reallocation of the program to the SRAM core is needed as a result of executing the program by the MRAM core. FIG. 14 is a third example of the memory hierarchy-based information table after the MRAM core has executed a certain program. Similarly to FIG. 11, in the memory hierarchy-based information table in FIG. 14, the "Time" and the "Instruction Count" columns are associated with each other. "Non-mem" stands for no memory being accessed. "L1 cache" represents the access to the L1 cache. "L2 cache" represents the access to the L2 cache. "Main storage" represents the access to the main storage.

The IPCs being calculated per memory hierarchy in this case are shown in the table of FIG. 15. FIG. 15 is the table illustrating the IPCs per memory in the case of the memory hierarchy-based information table in FIG. 14. As illustrated in FIG. 15, the IPC for both no memory being accessed and during the access of L1 cache are "4". However, since the L2 cache during-access IPC is "0.3", it is understood that the performance of the processor 1b decreases due to the latency of the L2 cache. In this case, to optimize performance, the scheduler 513 reallocates the operations from the MRAM core to the SRAM core.

Figure 16:
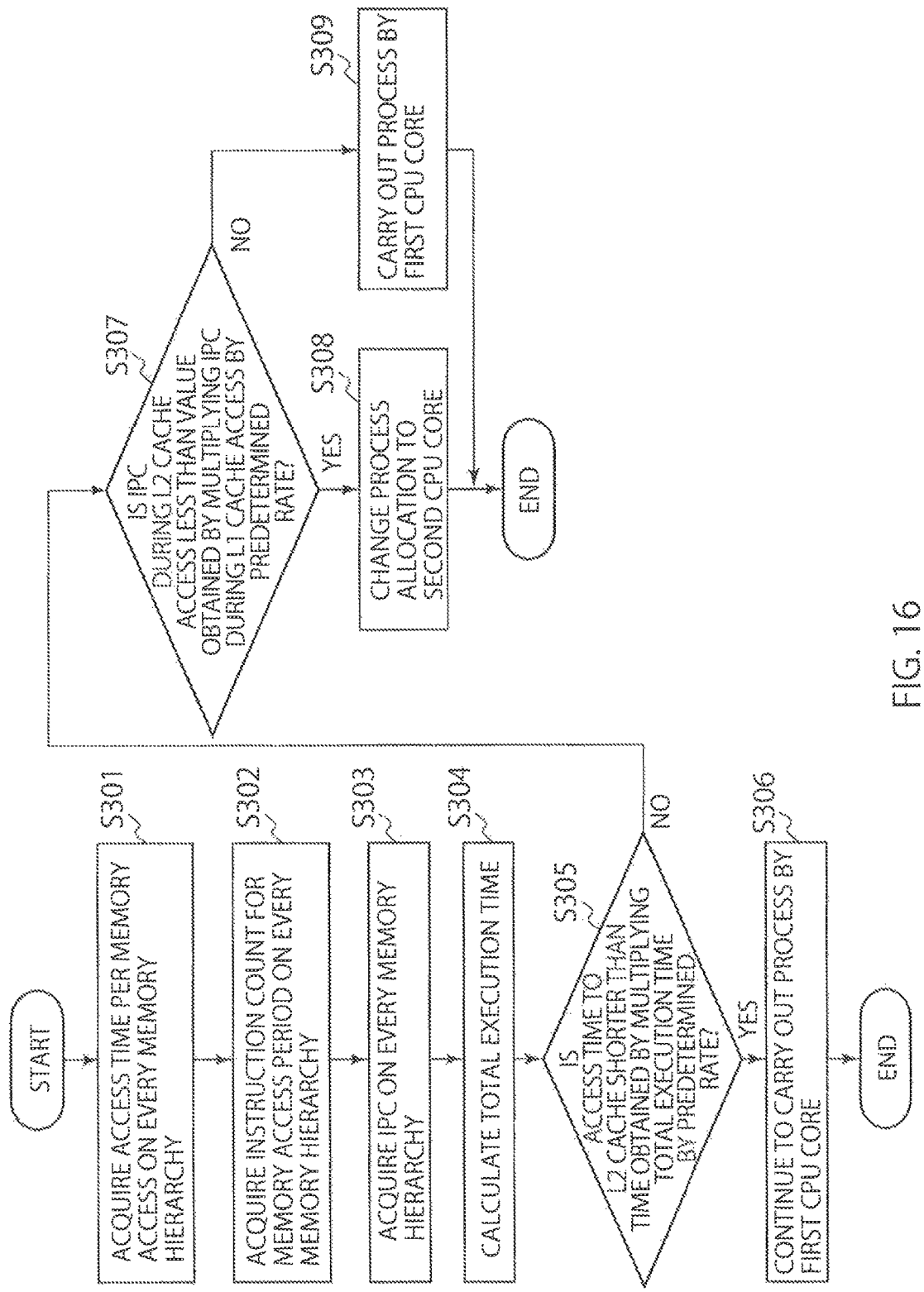
FIG. 16 is a flowchart illustrating a first example of processes of the processor 1b in the second embodiment.

FIG. 16 is a flowchart illustrating a first example of the processes of the processor 1b in the second embodiment. Hereinafter it is assumed that the processes are initially allocated to the first CPU core. The processor 1b executes the following processes upon an elapse of a predetermined time. Herein, the predetermined time corresponds to, for example, a cycle count, real time or acount of program instructions. For example, the processor 1b may execute the following processes upon executing 1000 instructions.

(Step S301) At first, the controller 41 of the monitoring unit 53 refers to the memory hierarchy-based information table T2 stored on the memory hierarchy-based information table storage 44, thus acquiring the access time per memory.

(Step S302) Next, the controller 41 of the monitoring unit 53 refers to the memory hierarchy-based information table T2 stored on the memory hierarchy-based information table storage 44, thus acquiring the instruction count per memory.

(Step S303) Subsequently, the controller 41 of the monitoring unit 53 divides the relevant instruction count by the relevant access time, per memory hierarchy, thereby acquiring the IPC per memory hierarchy.

(Step S304) Next, the scheduler 513 calculates, as a total execution time, a grand total of the access time to all of the memories within the memory hierarchy-based information table T2 stored on the memory hierarchy-based information table storage 44. In this example, the total execution time is calculated by using the information in the memory hierarchy-based information table T2. However, the method of calculating the total execution time is not limited to this calculation method. For instance, a table for counting the total execution time may also be separately maintained.

(Step S305) Subsequently, the scheduler 513 determines, for example, whether the access time to the L2 cache 103 is less than a period of time obtained by multiplying the total execution time of the program by a predetermined rate (e.g., 5%). In the case the access time to the L2 cache 103 is less than the period of time obtained by multiplying the total execution time of the program by the predetermined rate (YES), the scheduler 513 proceeds to step S306. Whereas when the access time to the L2 cache 103 is not less than the period of time obtained by multiplying the total execution time of the program by the predetermined rate (e.g., 5%) (NO), the scheduler 513 proceeds to step S307.

(Step S306) When determining in step S305 that the access time to the L2 cache 103 is less than the period of time obtained by multiplying the total execution time of the program by the predetermined rate, the scheduler 513 allows the first CPU core (MRAM core) 101 to continue to carry out the process, and the procedure comes to an end.

(Step S307) Whereas when determining in step S305 that the access time to the L2 cache 103 is not less than the period of time obtained by multiplying the total execution time of the program by the predetermined rate, the scheduler 513 determines whether the IPC during access to the L2 cache 103 is also less than a value obtained by multiplying the IPC during access to the L1 data cache 102 by a predetermined rate (e.g., 10%).

In a case the IPC during access to the L2 cache 103 is less than the value obtained by multiplying the IPC during access to the L1 data cache 102 by the predetermined rate (YES), the scheduler 513 proceeds to step S308. Whereas when the IPC in access to the L2 cache 103 is not less than the value obtained by multiplying the IPC during access to the L1 data cache 102 by the predetermined rate (NO), the scheduler 513 proceeds to step S309.

(Step S308) When determining in step S307 that the IPC during access to the L2 cache 103 is less than the value obtained by multiplying the IPC in access to the L1 data cache 102 by the predetermined rate, the scheduler 513 reallocates the processes from the first CPU core (MRAM core) 100 to the second CPU core (SRAM core) 200, and the procedure is finished.

(Step S309) When determining in step S307 that the IPC during access to the L2 cache 103 is not less than the value obtained by multiplying the IPC during access to the L1 data cache 102 by the predetermined rate, the scheduler 513 allows the first CPU core (MRAM core) 100 to continue to carry out the process, and the procedure is finished.

Note that the scheduler 513 initially checks the first condition and then checks the second condition in the present example. Nevertheless the embodiment is not limited to this order, and the scheduler 513 may check the conditions in a reversed order.

As discussed so far, in the first processing example of the second embodiment, the scheduler 513 allocates the processes to any one of the cores on the basis of the comparison between the access time to the MRAM-composed target memory and the total execution time, and the comparison between the IPC during access to the target memory and the IPC during access to another memory.

As a result, when the access time is sufficiently less than the total execution time of the program, the processes are allocated to the MRAM core. In this case, even when the MRAM core executes the processes and accesses the MRAM-composed target memory, the access time being sufficiently less than the total execution time of the program, the decrease in processing performance can be minimized.

Further, when the IPC during access to the target memory is less than the IPC during access to another memory, since the execution efficiency of the process decreases due to the access to the target memory, the performance decrease can be minimized by changing the allocation of the processes from the MRAM core to the SRAM core. On the other hand, when the IPC during access to the target memory does not considerably decrease as compared with the IPC during access to another memory, since the execution efficiency of the process does not considerably decrease due to the access to the target memory, it does not result in a large decrease of the performance even if the MRAM core continues to carry out the process.

Hence, in the first processing example of the second embodiment, the scheduler 513 can allocate the processes to the CPU core capable of minimizing the decrease in processing performance caused by the memory access, thereby enabling the computing performance of the processor to improve.

(Second Processing Example in the Second Embodiment)

Subsequently, a second processing example in the second embodiment will be described, in the first processing example, the scheduler 513 allocates the processes to any one of the cores on the basis of the result of the comparison between the access time to the L2 cache 103 and the total execution time and the result of the comparison between the IPC during access to the L2 cache 103 and the IPC during access to the L1 data cache 102.

By contrast, in the second processing example, the scheduler 513 allocates the processes to any one of the cores by referring to the access time to the main storage 400, the access time to the L2 cache 103, the IPC during access to the main storage 400 and the IPC during access to the L2 cache 103.

In case the access time to the L2 cache 103 is causing the decrease of the processing efficiency, this configuration enables changing the allocation of the processes from the MRAM core to the SRAM core. As a result, since access is switched from the MRAM L2 cache to the SRAM L2 cache, the processing efficiency can be expected to improve due to the improvement of the access speed to the L2 cache. Moreover, in case the access time to the main storage 400 is causing the decrease of the processing efficiency, it is possible to change the allocation of the processes from the SRAM core to the MRAM core. As a consequence, since access is switched from the SRAM L2 cache to the MRAM L2 cache, the capacity of the L2 cache increases, the frequency of accessing the main storage decreases, and the processing efficiency can be therefore expected to improve. Processes of the scheduler 513 will hereinafter be described in concrete terms. For example, the scheduler 513 calculates, during the execution by the SRAM core, a degree of IPC decrease of the main storage 400 and a degree of IPC decrease of the L2 cache 203. To be specific, for example, the scheduler 513 divides an IPC during access to the main storage 400 by an IPC during access to a cache of a hierarchy higher than the main storage 400. Then, the scheduler 513 calculates a numeric value obtained by subtracting a value of the abovementioned division from "1" as the degree of IPC decrease of the main storage 400. Herein, the IPC during access to the cache of the hierarchy higher than the main storage 400 is, for example, the IPC during access to the L2 cache 203, or the IPC during access to the L1 cache, or the IPC when the memory is not accessed or the IPC of the whole procedure. Furthermore, for example, the scheduler 513 divides the IPC during access to the L2 cache by the IPC during access to the cache of the hierarchy higher than the L2 cache 203 (e.g., the IPC during access to the L1 cache, or the IPC when the memory is not accessed, or the IPC of the whole procedure). Then, the scheduler 513 calculates a numeric value obtained by subtracting a value of the above-mentioned division from "1" as the degree of IPC decrease of the L2 cache 203.

For instance, during the execution by the SRAM core, if a product of the access time to the main storage 400 and the degree of IPC decrease of the main storage 400 is larger than a product of the access time to the L2 cache 203 and the degree of IPC decrease of the L2 cache 203, the scheduler 513 changes the allocation of the processes from the SRAM core to the MRAM core because the access to the main storage 400 from the L2 cache 203 is delayed. Herein, the product of the access time to the main storage 400 and the degree of IPC decrease of the main storage 400 is a coefficient corresponding to the delay time in the main storage 400. The product of the access time to the L2 cache 203 and the degree of IPC decrease of the L2 cache 203 is a coefficient corresponding to the delay time in the L2 cache 203.

As described above, in this configuration, the MRAM L2 cache 103 has a capacity larger than the capacity of the SRAM L2 cache 203 which enables the MRAM core to access the main storage 400 in less time than the SRAM core and to shorten the delay time for the access to the main storage 400. As a result, the scheduler 513 can be expected to improve the execution efficiency of the processing.

Further, for example, the scheduler 513 determines whether both a ratio of the access time to the target L2 cache accessible by the core currently executing the process to the total execution time and a ratio of the access time to the main storage 400 to the total execution time, are larger than a threshold value. When both are larger than the threshold value, the scheduler 513 compares a product of the access time to the target L2 cache and a degree of IPC decrease of the target L2 cache with a product of the access time to the main storage 400 and a degree of IPC decrease of the main storage 400. In case the smaller product is the product of the access time to the target L2 cache and the degree of IPC decrease of the target L2 cache, the access to the main storage 400 is more delayed than the access to the target L2 cache. On the other hand, in case the smaller product is the product of the access time to the main storage 400 and the degree of IPC decrease of the main storage 400, the access to the target L2 cache is more delayed than the access to the main storage 400.

One example assumes that the processes are initially allocated to the MRAM core. For example, it is assumed that the target L2 cache is the MRAM-compose L2 cache 103. When the product of the access time to the L2 cache 103 and the degree of IPC decrease of the L2 cache 103 is larger than the product of the access time to the main storage 400 and the degree of IPC decrease of the main storage 400, and when the access to the L2 cache 103 is more delayed than the access to the main storage 400, the scheduler 513 changes the allocation of the processes from the MRAM core to the SRAM core.

With this configuration, the allocation of the processes to the SRAM core leads to the reduction of the delay time of the access to the L2 cache since the SRAM core accesses the L2 cache 203 faster than it accesses the L2 cache 103. As a result, the scheduler 513 can be expected to improve the execution efficiency of the processing.

Another example assumes that the processes are initially allocated to the SRAM core. For instance, it is assumed that the target L2 cache is the SRAM-composed L2 cache 203. When the product of the access time to the main storage 400 and the degree of IPC decrease of the main storage 400 is larger than the product of the access time to the L2 cache 203 and the degree of IPC decrease of the L2 cache 203, and when the access to the main storage 400 is more delayed than the access to the L2 cache 203, the scheduler 513 changes the allocation of the processes from the SRAM core to the MRAM core. With this configuration, the allocation of the processes to the MRAM core leads to the reduction of the delay time of the access to the main storage 400 since the access count to the main storage 400 decreases due to the capacity of the L2 cache 103 accessed by the MRAM core being larger than the capacity of the L2 cache 203. The value of the IPC during access to the main storage 400 is therefore ameliorated. As a result, the scheduler 513 can be expected to improve the execution efficiency of the processing.

Figure 17:
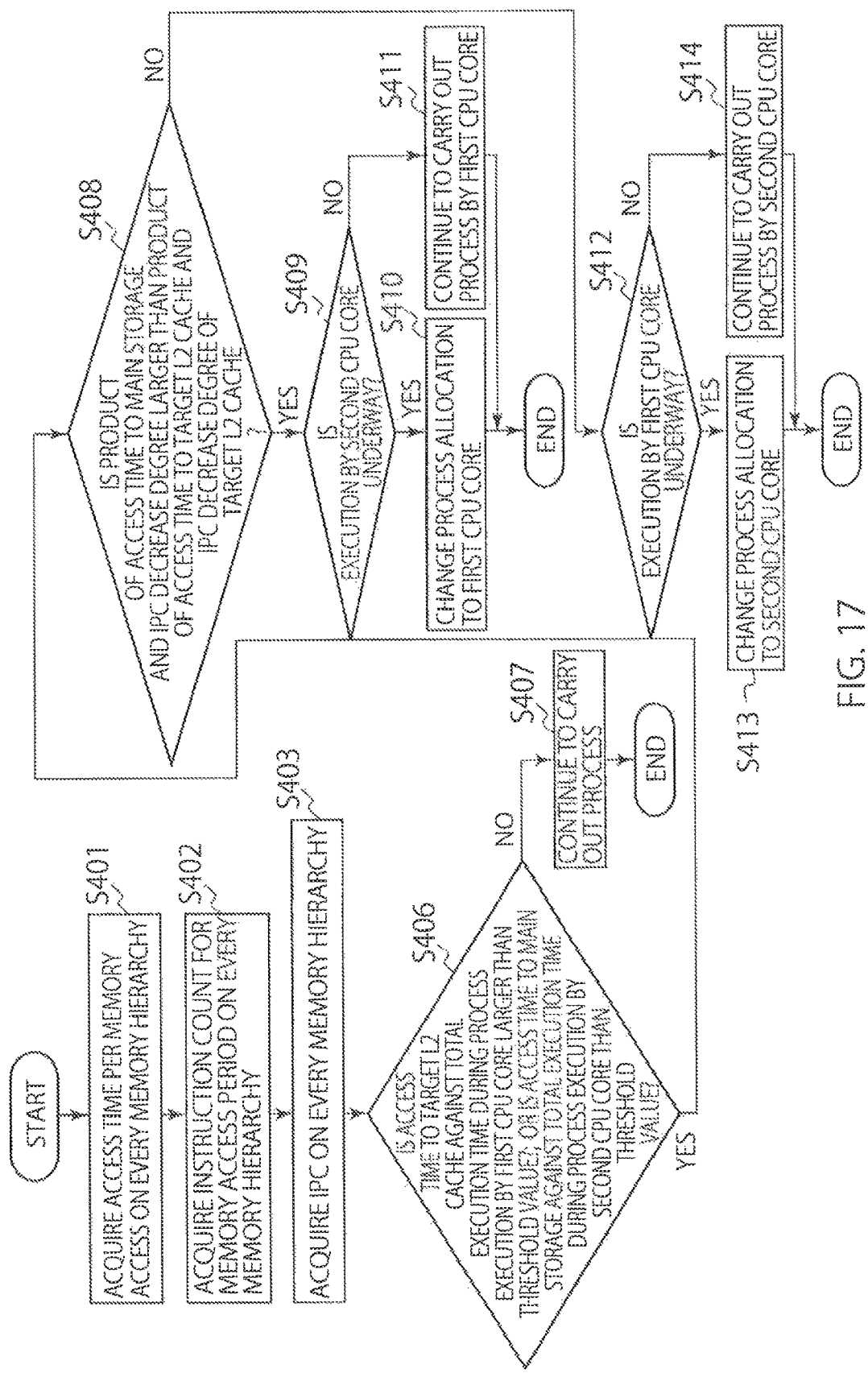
FIG. 17 is a flowchart illustrating a second example of the processes of the processor 1b in the second embodiment.

FIG. 17 is a flowchart illustrating a second processing example of the processes of the processor 1b in the second embodiment. The processor 1b executes the following processes upon an elapse of the predetermined time. Herein, the predetermined time corresponds to, for example, a cycle count, real time or a count of program instructions. For example, the processor 1b may execute the following processes upon executing 1000 instructions.

Processes of steps S401-S403 are the same as those of steps S301-S303 in FIG. 16, and hence the descriptions thereof are omitted.

(Step S406) Next, with the first CPU core 100 executing the process underway, the scheduler 513 checks whether the access time to the target L2 cache against the total execution time is larger than a threshold value. Further, with the second CPU core executing the process underway, the scheduler 513 checks whether the access time to the main storage 400 against the total execution time is larger than the threshold value. With the first CPU core executing the process underway, when the access time to the target L2 cache against the total execution time is larger than the threshold value; alternatively, with the second CPU core executing the process underway, when the access time to the main storage 400 against the total execution time is larger than the threshold value, the scheduler 513 proceeds to step S408. These conditions not being met, it proceeds to step S407.

(Step S407) When the process in execution does not meet the conditions in step S406, the scheduler 513 allows the core currently executing the process to continue to carry out the process.

(Step S408) The scheduler 513 determines whether a product of the access time to the main storage 400 and the degree of IPC decrease of the main storage 400 (hereinafter main storage product) is larger than a product of the access time to the target L2 cache and the degree of IPC decrease of the target L2 cache (hereinafter target L2 product). In case the main storage product is larger than the L2 product (YES), the scheduler 513 proceeds to step S409. On the other hand, in the case the main storage product is equal to or less than the target L2 product (NO), the scheduler 513 proceeds to step S412.

(Step S409) When determining in step S408 that the main storage product is larger than the target L2 product, the access to the main storage 400 is more delayed than the access to the target L2 cache. In this case, the scheduler 513 determines whether the second CPU core 200 is executing the process underway. When the second CPU core is executing the process underway (YES), the scheduler 513 proceeds to step S410. On the other hand, when the second CPU core 200 is not executing the process underway (NO), the scheduler 513 proceeds to step S411.

(Step S410) When determining in step S409 that the second CPU core 200 is executing the process underway, the scheduler 513 switches over the allocation of the processes from the second CPU core 200 to the first CPU core 100. Consequently, since the capacity of the L2 cache 103 accessed by the first CPU core (MRAM core) 100 is larger than the capacity of the L2 cache 203, the access count to the main storage 400 decreases, thus enabling the reduction of the delay time for access to the main storage 400. The value of the IPC during access to the main storage 400 is therefore ameliorated. As a result, the scheduler 513 can be expected to improve the execution efficiency of the processing.

(Step S411) When determining in step S409 that the second CPU core 200 is not executing the process underway, the scheduler 513 allows the first CPU core 100 to continue to carry out the process.

(Step S412) When determining in step S408 that the main storage product is equal to or less than the target L2 product, the access to the target L2 cache is more delayed than the access to the main storage 400. In this case, the scheduler 513 determines whether the first CPU core 100 is executing the process underway. When the first CPU core 100 is executing the process underway (YES), the scheduler 513 proceeds to step S413. Whereas when the first CPU core 100 is not executing the process underway (NO), the scheduler 513 proceeds to step S414.

(Step S413) When determining in step S412 that the first CPU core 100 is executing the process underway, the scheduler 513 changes the allocation of the processes from the first CPU core 100 to the second CPU core 200. Consequently, the L2 cache 203 accessed by the second CPU core (SRAM core) 200 is faster than the L2 cache 103, and hence the delay time for the access to the L2 cache is reduced. As a result, the scheduler 513 can be expected to improve the execution efficiency of the processing.

(Step S414) When determining in step S412 that the first CPU core 100 is not executing the process underway, the scheduler 513 allows the second CPU core 200 to continue to carry out the process.

As discussed so far, in the second processing example of the second embodiment, the scheduler 513 determines the allocation of the processes to the cores on the basis of the result of the comparison between the access time to the main storage 400 and the access time to the L2 cache 103, at least one of the comparison between the access time to the main storage 400 and the threshold value and of the comparison between the access time to the L2 cache 103 and the threshold value, and the result of the comparison between the IPC during access to the main storage 400 and the IPC during access to the L2 cache 103.

In case the access time to the L2 cache 103 becomes a main factor for the decrease of the processing efficiency, the allocation of the processes can be thereby changed from the MRAM core to the SRAM core. As a consequence, since access is switched from the MRAM L2 cache to the SRAM L2 cache, the access speed to the L2 cache is improved, and hence the processing efficiency can be expected to improve. Further, in case the access time to the main storage 400 becomes the main factor for the decrease of the processing efficiency, the allocation of the processes can be changed from the SRAM core to the MRAM core. Consequently, since the access is switched from the SRAM L2 cache to the MRAM L2 cache, the capacity of the L2 cache increases, the frequency of accessing the main storage decreases and the processing efficiency can be therefore expected to improve.

(Third Processing Example in the Second Embodiment)

Subsequently, a third processing example in the second embodiment will be described. In the third processing example, the scheduler 513 compares execution information of the MRAM core with execution information of the SRAM core as predicted from the execution information of the MRAM core, thereby determining the core to which the processes are allocated.

More specifically, the scheduler 513 allocates the processes to any one of the cores based on respective overheads due to the latencies caused by each core accessing memories on corresponding hierarchies in different memory systems, based on a predicted cache misses increase count accompanying a migration of the processes from the MRAM core to the SRAM core and based on a migration overhead defined as time necessary for changing the allocation of the processes. Herein, the plurality of cores is each capable of accessing the memories contained in mutually different memory systems in a plurality of memory systems each including a plurality of hierarchically connected memories. Moreover, the memories on the corresponding hierarchies in different memory systems accessed by each core are, by way of one example, the L2 cache 103 and the L2 cache 203.

A concrete example of the processes of the scheduler 513 is hereinafter described. One example assumes that the processes are initially allocated to the MRAM core. Under this premise, the scheduler 513 obtains a differential value between, "an overhead due to a L2 cache misses in the SRAM core" and "an overhead due to a L2 cache latency of the MRAM core" after an elapse of a predetermined period of time since the MRAM core has started the execution. Then, the scheduler 513 commands, for example, the MRAM core to continue to carry out the processes when the differential value is less than the migration overhead, and reallocates the processes to the SRAM core when the differential value is equal to or larger than the migration overhead. Through this operation, the scheduler 513 decides to switch the allocation of the processes by taking into account the migration overhead. It is therefore feasible to minimize an occurrence frequency of situations when the overhead due to the change of the allocation of the processes exceeds an effect of the processing efficiency improving due to the processes allocation change.

Note that the migration overhead is defined as a threshold value for adjusting a frequency of migration among the program executing cores. The migration overhead may be a constant set in advance before executing the process or it may also be a value being calculated from an execution history or the like. The migration overhead may also be an overhead necessary for a migration of a program execution core which value is calculated by the scheduler 513. In the second embodiment, as one example, the migration overhead is set in advance before executing the program as "5%" of the total execution time of the program.

The scheduler 513 calculates, for example, an overhead "OH_L2M" caused by the L2 cache latency of the MRAM core by using the following formula (1).

OH_L2M=MRAM Total Access Latency×Degree of IPC Decrease (1)

The MRAM total access latency is an integrated value of the access latency of the L2 cache 103 when the predetermined time elapses since the start of the process. The scheduler 513 sets, "1000" as the total access latency when using for example, a value of the access time to the L2 cache of the monitoring unit 53 in FIG. 14 as the total access latency. Thus, the scheduler 513 may set, as the MRAM total access latency, a value of the access time to the L2 cache in the memory hierarchy-based information table T2.

The degree of IPC decrease may be calculated by making use of, for example, the monitoring unit 53. The scheduler 513 calculates, based on, for example, the information of the monitoring unit 53, the degree of IPC decrease by comparing the IPC during access to the L2 cache and the information of the cache on a hierarchy higher than the L2 cache which includes IPC (e.g., the IPC of the L1 cache, or the IPC for no memory access, or the IPC of the whole processes). In concrete terms, for example, the scheduler 513 calculates, as the degree of IPC decrease in relation to the L2 cache, a value obtained by dividing the IPC during access to the L2 cache by the IPC of the L1 cache and subtracting the value of the abovementioned division from "1".

Note that a method of obtaining the total access latency is not limited to the method described above. For example, the latency of the access to the MRAM L2 cache being a fixed value, the scheduler 513 may calculate the total access latency by multiplying the latency of the access to the MRAM L2 cache by the L2 cache access count obtained during the execution of the program.

The values shown in FIG. 12, which were calculated from those in FIG. 11, indicate that the IPC during access to the L2 cache is "0.3". The IPC of the hierarchy higher than the L2 cache may be based on a value of the L1 cache or on a "Non-mem" value but in the second embodiment, the scheduler 513 uses "4" as the "Non-mem" value as one example. The scheduler 513 calculates the degree of IPC decrease from, for example, these values thus resulting in 0.925 (=1−(0.3÷4)). Then, the scheduler 513 calculates the overhead caused by the L2 cache latency of the overhead MRAM core due to the L2 cache latency of the MRAM core, resulting in 925 (=1000×0.925).

The scheduler 513 calculates, for example, an overhead "OH_L2S" due to the L2 cache misses in the SRAM core by using the following formula (2). Note that acquiring the execution information of the SRAM core during the execution of the program by the MRAM core entails predicting SRAM core execution information based on MRAM core execution information.

OH_L2S=Main Storage Access Latency×Increase Count Predicted Value of L2 Cache Miss by SRAM Core (2)

The main storage access latency is a latency needed for accessing the main storage once. The scheduler 513 may set, as the main storage access latency, a value obtained by dividing the access time to the main storage 400, which is stored in the memory hierarchy-based information table T2 of the monitoring unit 53 connected to the first CPU core (MRAM core) 100, by the main storage access count. Herein, the access time to the main storage 400, which is stored in the memory hierarchy-based information table T2, is an integrated value obtained by integrating access times of one or more memory accesses to the main storage 400. Further, the latency of the access to the main storage 400 may be a fixed value. In the second embodiment, the scheduler 513 uses "200" as the main storage latency as one example.

The scheduler 513 can predict the increase count predicted value of the L2 cache misses due to the SRAM core by making use of LRU (Least Recently Used) cache access information in the MRAM core. First, basic operations of the LRU cache will hereinafter be described along with a regular cache.

FIG. 18 depicts one example of a diagram of the cache memory in the second embodiment. The cache memory retains, as depicted in FIG. 18, a "Set" per hash value of a memory address. "Way" represents an upper limit count of the data of the same Set allowed to be retained. A region R181 in FIG. 18 is a visual expression of the index information (tag memory array) of Sets. A region R182 therein is a visual representation of the index information (tag memory array) of Ways. Further, a region R183 represents the data storing cache memory itself (data memory array).

A hash function for determining an associative relationship between the memory address and the Set has a variety of expressions. In the second embodiment, as one example, a Set count is "10", and hence Set is determined by a high-order 3-bit value of the address. For example, the data of 32-bit address "01000001010101010101010101010101" is stored in Set3 because of the high-order bits are "010".

The common method for determining which data among the data of the same Set is kept is the foregoing LRU. In the LRU, the most recently accessed data are arranged sequentially from Way1 to Way8. For instance, the data arranged in Way1 is referred to more recently than the data arranged in Way2. Such a data arrangement is realized by placing the accessed data in Way1 and shifting the other data by one Way. Further, when new data is arranged in the cache, the data of Way8 is migrated from the cache to a low-order hierarchy.

A regular cache as the one in FIG. 18 exhibits the same behavior of the cache access of the same Way number, when having the same Set count. Taking for example a SRAM 1 MB 4-Way cache and a MRAM 4 MB 16-Way cache, each having the same Set count, an access history up to SRAM 4-Way is the same as an access history up to MRAM 4-Way. On the contrary, the accesses to Ways through Way16 of MRAM 4 MB are cache hits in MRAM 4 MB but result in cache misses in SRAM 1 MB.

Accordingly, the scheduler 513 counts, during the execution by the MRAM core, accesses to Ways not existing in the cache of the SRAM core, thereby acquiring an increased cache misses count in the SRAM core. In this case, the scheduler 513 may acquire this access count per Way by using an access counter prepared per Way or may also acquire the access count by employing the access counter prepared per plurality of Ways.

In the second embodiment, "3" is given as one example of the acquired access increase count predicted value in the SRAM core. In this case, "600" (=200×3) is the overhead due to the L2 cache misses of the SRAM.

The scheduler 513 subtracts, for example, the overhead derived from the L2 cache misses due to the SRAM core from the overhead due to the L2 cache latency of the MRAM core as calculated above. In this example, 325 (=925−600) is a subtraction value obtained by using the said subtraction.

A premise herein is that the migration overhead is 5% of the time expended from a start of the program to an end thereof (hereinafter the total execution time of the program).

Based on this premise, for example, when the total execution time of the program is 10000 cycles, the calculated subtraction value "325" is less than the migration overhead "500" (=10000×5/100). Hence, the scheduler 513 allows the MRAM core to continue to carry out the process.

Whereas when the total execution time of the program is, for example, 5000 cycles, the calculated subtraction value "325" is equal to or larger than the migration overhead "250" (=5000×5/100). Therefore, the scheduler 513 allocates the processes from the MRAM core to the SRAM core.

Figure 19:
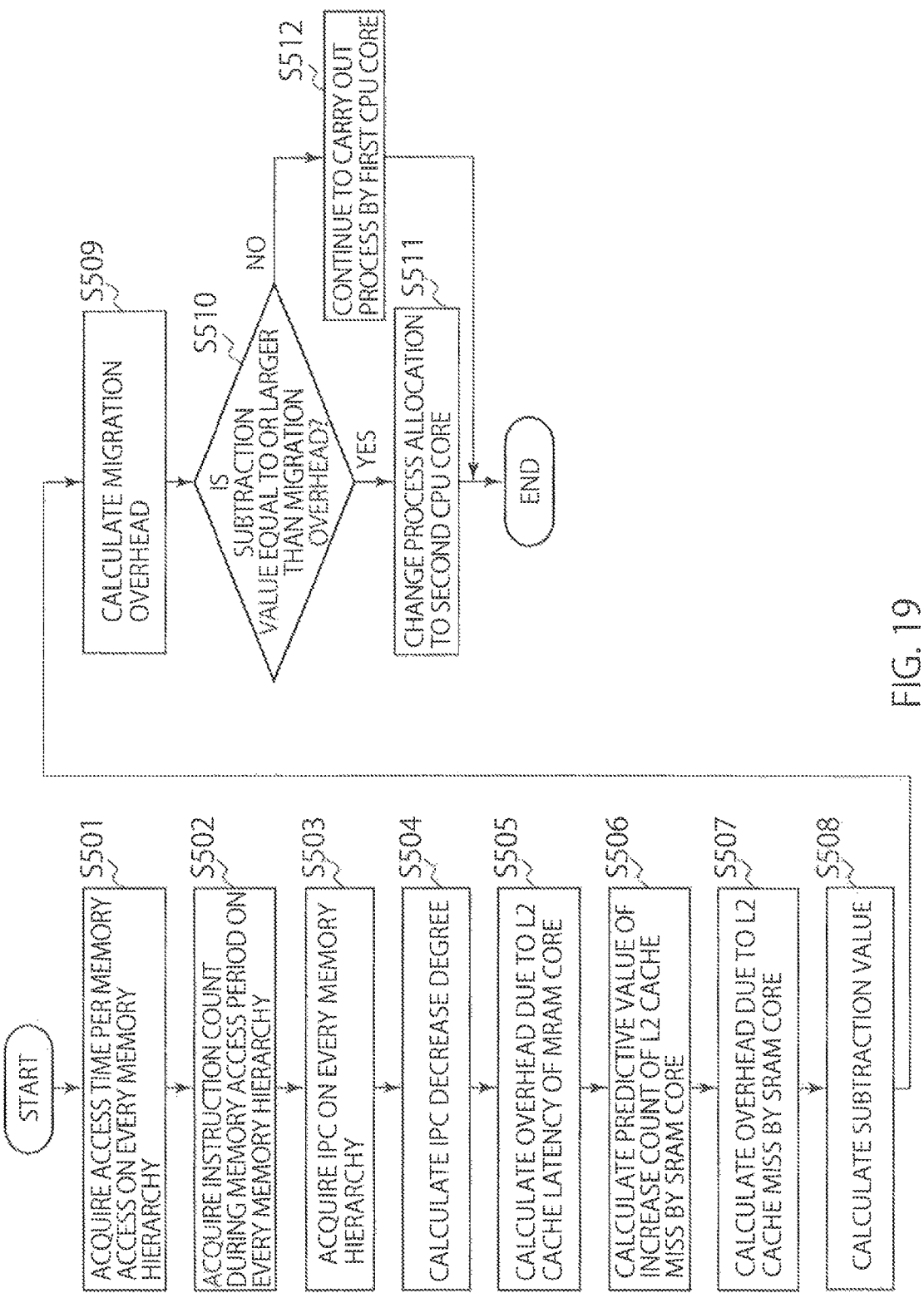
FIG. 19 is a flowchart illustrating a third example of the processes of the processor 1b in the second embodiment.

FIG. 19 is a flowchart illustrating a third processing example of the processes of the processor 1*b* in the second embodiment.

Processes of steps S501-S503 are the same as those of steps S301-S303 in FIG. 16, and hence the explanations thereof are omitted.

(Step S504) Next, the scheduler 513 calculates the degree of IPC decrease.

(Step S505) Subsequently, the scheduler 513 calculates the overhead due to the L2 cache latency of the MRAM core.

(Step S506) Next, the scheduler 513 calculates the Increase count predicted value of the L2 cache misses of the SRAM core.

(Step S507) Subsequently, the scheduler 513 calculates the overhead due to the L2 cache misses of the SRAM core.

(Step S508) Next, the scheduler 513 subtracts the overhead due to the L2 cache misses of the SRAM core from the overhead due to the L2 cache latency of the MRAM core, thereby acquiring the subtraction value given by the said subtraction.

(Step S509) Subsequently, the scheduler 513 calculates the migration overhead. The fixed value migration overhead being used in this example, the scheduler 513 reads out from the storage area in which the migration overheads are stored.

(Step S510) Next, the scheduler 513 determines whether the subtraction value is equal to or larger than the migration overhead. When the subtraction value is equal to or larger than the migration overhead (YES), the scheduler 513 proceeds to step S511. When the subtraction value is not equal to or larger than the migration overhead (NO), the scheduler 513 proceeds to step S512.

(Step S511) If it is determined in step S510 that the subtraction value is equal to or larger than the migration overhead, the scheduler 513 changes the allocation of the processes from the first CPU core (MRAM core) 100 to the second CPU core (SRAM core) 200.

(Step S512) Next, if it is determined in step S510 that the subtraction value is not equal to or larger than the migration overhead, the scheduler 513 allows the first CPU core 100 to continue to carry out the process.

The scheduler 513 acquires, in the third process in the second embodiment, the differential value between "the overhead due to the L2 cache misses in the SRAM core" and "the overhead due to the L2 cache latency of the MRAM core" after the elapse of the predetermined period of time since the MRAM core has started execution. Then, the scheduler 513, for example, allows the MRAM core to continue to carry out the process when the differential value is less than the migration overhead, and changes the allocation of the processes from the MRAM core to the SRAM core when the differential value is equal to or larger than the migration overhead. Through this operation, the scheduler 513 decides to switch the allocation of the processes by taking into account the migration overhead. Improved occurrence frequency of situations when the effect of the improvement in the processing efficiency due to the processes allocation change exceeds the overhead due to the change of the allocation of the processes can be expected.

Note that the third process described above is merely one example, and the embodiment is not limited to this process. In the example, the scheduler 513 compares the differential value with the migration overhead and allocates, based on the result of the comparison, the processes to any one of the cores. However, the scheduler 513 may allocate, without being limited to this allocation method, the processes to any one of the cores on the basis of a result of a comparison between a first degree of performance decrease and a second degree of performance decrease.

The following is a summary of the third process in the second embodiment as discussed so far. The computing operation is allocated to the first CPU core 100 or the second CPU core 200, thereby enabling a selection of a first memory accessible by the first CPU core 100 and a selection of a second memory, accessible by the second CPU core 200, of a smaller capacity and a lower latency than the first memory for each process.

The evaluation unit 413 evaluates the computing performance per memory of the plurality of memories included in the first memory during the execution of the process by the first core.

Then, the scheduler 513 specifies the first degree of performance decrease due to the latency of the first memory by using the evaluated computing performance; specifies, from the LRU access information in the first memory, the second degree of performance decrease due to unretained data in the second memory; compares the first degree of performance decrease with the second degree of performance decrease; and allocates the processes to any one of the cores based on a result of this comparison.

Note that the computing performance evaluated by the evaluation unit 413 can have a variety of applications. For example, as in the second embodiment, an OS (Operating System) refers to the computing performance (e.g., the degree of IPC decrease) obtained from the evaluation unit, and may use the computing performance as determining information for allocating the processes to the appropriate core. Further, a programmer refers to the computing performance (e.g., the degree of IPC decrease) obtained from the evaluation unit, and may optimize by improving a data structure or an algorithm for the target processes (software).

Moreover, a variety of implementations of the monitoring unit may be considered, one of which being a performance counter (performance monitor) function to measure the execution efficiency of the process. The performance counter function may include all of the time information acquiring unit 411, the computation amount acquiring unit 412 and the evaluation unit 413 discussed in the above embodiments, and may also include only the time information acquiring unit 411 and the computation amount acquiring unit 412. In other words, the implementation may use, as a value of the performance counter, the output result of the evaluation unit 413 or the output results of the time information acquiring unit and of the computation amount acquiring unit.

Note that a system including a plurality of apparatuses may distribute the processes of the monitoring unit or the information processing apparatus in the respective embodiments among the plurality of apparatuses for execution.

Furthermore, a program for executing the respective processes of the monitoring unit or the information processing apparatus in the respective embodiments may be recorded on a computer readable recording medium. A computer system may read and execute the program recorded on the recording medium, whereby the variety of foregoing processes related to the monitoring unit or the information processing apparatus may be carried out.

Note that the "computer system" connoted herein may be a system including the OS and hardware such as peripheral devices and the like. Further, the "computer system" may include a homepage providing environment (or a homepage viewing environment) in the case of utilizing a WWW system. Moreover, the "computer readable recording medium" connotes storages such as flexible disks, magneto-optic disks, ROMs (Read Only Memory), writable nonvolatile memory like a flash memories etc., portable medium like CD-ROMs etc. and hard disks built in the computer system.

Still further, the "computer readable recording medium" may include storages retaining the program for a fixed period of time, such as a volatile memory (e.g., a DRAM, Dynamic Random Access Memory) provided within the computer system serving as a server or a client in the case of transmitting the program via a network such as the Internet and a communication line such a telephone line. Yet further, the program may be transmitted via a transmission medium or via transmitted waves within the transmission medium to another computer system from the computer system with the program being stored on the storage etc. Herein, the "transmission medium" for transmitting the program connotes a medium having a function to transmit the information, namely networks (communication networks) such as the Internet and communication lines (communication wires) such as the telephone lines. Moreover, the program may be a software component for attaining a part of the functions described above. Furthermore, a so-called a differential file (differential program) may also be available, the file enabling the foregoing function to be attained in combination with a program being already recorded on the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing method, comprising:
   detecting a start and an end of an access of a memory access circuit in each of a plurality of cores to a target memory, the access of the memory access circuit being due to instructions of an instruction issuing circuit, and acquiring a memory access time being a time from the start of the access till the end of the access per memory access circuit in each of the plurailty of cores;
   calculating based on the instructions of the instruction issuing circuit, a computation amount of a computing circuit in each of the plurality of cores from the start of the access till the end of the access;
   evaluating based on the memory access time and the computation amount, computing performance of the computing circuit from the start of the access till the end of the access per core of the plurality of cores; and
   allocating processes to any one of the cores based on at least a comparison of computing performances of the cores, the processes representing a sequence of instructions to be processed by the issuing circuit in the allocated core.

2. The information processing method according to claim 1, comprising:
   evaluating the computing performance per memory of a plurality of memories being hierarchically connected, and
   comparing, per memory of the plurality of memories, the computing performance evaluated and acquired and allocating the processes to any one of the cores based on the comparing.

3. The information processing method according to claim 1, comprising allocating the processes to any one of the cores based on the memory access time in addition to the computing performance of the computing circuit.

4. The information processing method according to claim 3, comprising:
   acquiring the memory access time per each memory of the plurality of memories being hierarchically connected,
   evaluating the computing performance per each memory of the plurality of memories, and
   comparing, among memories, a product of the memory access time acquired and a degree of performance decrease obtained from the computing performance being evaluated and acquired, and allocating the processes to any one of the cores based on the comparing.

5. The information processing method according to claim 3, wherein a first memory accessible by the first core and a second memory, of a smaller capacity and of a lower-speed latency than the first memory, accessible by the second core can be selected, for each computation, by allocating processes to the first core or the second core,
   the method comprising evaluating the computing performance per each memory of a plurality of memories included in the first memory during the execution of the process by the first core, and
   determining a first degree of performance decrease due to the latency of the first memory by the making use of the evaluated computing performance; determining, from an LRU access information of the first memory, a second degree of performance decrease due to not retaining data in the second memory; comparing the first degree of performance decrease with the second degree of performance decrease, and, based on the comparing, allocating the processes to any one of the cores.

6. An information processing apparatus including a processor, the processor being configured to control the information processing apparatus to perform operations comprising:
   detecting a start and an end of an access of a memory access circuit in each of a plurality of cores to a target memory, the access of the memory access circuit being due to instructions of an instruction issuing circuit, and acquiring a memory access time being a time from the start of the access till the end of the access per memory access circuit in each of the plurality of cores;
   calculating based on the instructions of the instruction issuing circuit, a computation amount of a computing circuit in each of the plurality of cores from the start of the access till the end of the access;
   evaluating based on the memory access time and the computation amount, computing performance of the computing circuit from the start of the access till the end of the access per core of the plurality of cores; and
   allocating processes to any one of the cores based on at least a comparison of computing performances of the cores, the processes representing a sequence of instructions to be processed by the issuing circuit in the allocated core.

\* \* \* \* \*